US006554324B1

(12) United States Patent
Herman (10) Patent No.: US 6,554,324 B1
(45) Date of Patent: Apr. 29, 2003

(54) APPARATUS AND METHOD FOR CONNECTING TUBULAR MEMBERS

(75) Inventor: Richard J. Herman, Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 49 days.

(21) Appl. No.: 09/704,215

(22) Filed: Oct. 31, 2000

(51) Int. Cl.[7] ................................................ F16L 21/06
(52) U.S. Cl. ............... 285/322; 285/123.9; 285/123.11; 285/900; 285/920
(58) Field of Search ................................. 285/322, 323, 285/920, 900, 123.11, 123.9

(56) References Cited

U.S. PATENT DOCUMENTS

| | | | |
|---|---|---|---|
| 3,096,999 A | * | 7/1963 | Ahlstone et al. ............. 166/340 |
| 3,322,443 A | | 5/1967 | Brown |
| 3,797,835 A | | 3/1974 | Wehner |
| 3,986,729 A | | 10/1976 | Taylor |
| 3,997,199 A | | 12/1976 | Arnold |
| 4,049,297 A | | 9/1977 | Reneau |
| 4,126,183 A | | 11/1978 | Walker |
| 4,265,470 A | | 5/1981 | Danner |
| 4,372,584 A | | 2/1983 | Miller |
| 4,441,740 A | * | 4/1984 | Cowan et al. ................. 285/18 |
| 4,708,376 A | * | 11/1987 | Jennings et al. ............. 285/315 |
| 4,795,198 A | * | 1/1989 | Hjelset ........................ 285/32 |
| 4,800,644 A | | 1/1989 | Muellenberg |
| 4,844,511 A | * | 7/1989 | Galle et al. ................... 285/18 |
| 4,903,994 A | | 2/1990 | Buckley |
| 4,949,786 A | * | 8/1990 | Eckert et al. ................ 166/208 |
| 4,968,183 A | | 11/1990 | Hannus et al. |
| 5,022,472 A | * | 6/1991 | Bailey et al. ................ 175/195 |
| 5,609,368 A | | 3/1997 | Maki et al. |
| 5,617,918 A | | 4/1997 | Cooksey et al. |
| 6,293,343 B1 | | 9/2001 | Pallini, Jr. et al. .......... 166/345 |

* cited by examiner

Primary Examiner—Anthony Knight
Assistant Examiner—G M Collins
(74) Attorney, Agent, or Firm—Michael P. Hartman; Peter A. Birlinski (57) ABSTRACT

A connector for connecting a first tubular member to a second tubular member is disclosed, for example for connecting a riser to a wellhead in a subsea oilfield location. The second tubular member has a seating surface and comprises an engagable locking profile. The connector comprises a housing for securing the connector to the end portion of the first tubular member, the housing comprising a seating surface for contacting the seating surface of the second tubular member. A locking assembly is provided having a locking portion engagable with the locking profile of the second tubular member, the locking assembly movable between an unlocked position, in which the locking portion of the locking assembly is not in engagement with the locking profile of the second tubular member, to a locked position, in which the locking portion of the locking assembly is engaged with the locking portion of the second tubular member and in which the seating surface of the housing is in contact with the seating surface of the second tubular member. The connector further includes a first actuator, operable to move the locking assembly from the unlocked position to the locked position, and a second actuator, operable after operation of the first actuator to apply an axial tensile load to the locking assembly, thereby urging the seating surface of the housing against the seating surface of the second tubular member. A method of connecting a first tubular member to a second tubular member is also disclosed.

24 Claims, 6 Drawing Sheets

APPARATUS AND METHOD FOR CONNECTING TUBULAR MEMBERS

TECHNICAL FIELD OF THE INVENTION

The present invention relates to an apparatus for connecting tubular members and a method for achieving the same. In particular, the present invention relates to an apparatus and method for connecting tubular members of use, for example, in oil field applications.

BACKGROUND OF THE INVENTION

In many operations the need arises to connect tubular members, such as pipes for carrying fluids. This is particularly the case in oil field operations, especially in offshore operations for the exploration or production of hydrocarbons. One particular need for means to connect tubular members arises during offshore operations when it is desired to connect a riser from the surface structure or vessel to a wellhead located on the sea floor. The development of deep draft caisson vessels (DDCV) and tension leg platforms (TLP) has led to a need for the subsea wellhead installations and the riser systems to be of a compact design, in order to reduce weight, and space and loading requirements. A number of designs of connectors for use in oilfield applications have been proposed, details of which are as follows.

U.S. Pat. No. 3,322,443 discloses a quick coupling device for tubular bodies comprising a male member having a pin portion and a female member having a socket for receiving the pin portion of the male member. A nut is threaded onto the outer portion of the pin portion of the male member and carries on its outer surface a series of cams. The cams on the outer surface of the nut cooperate with corresponding cams on the inner surface of the socket portion of the female member when the pin portion is inserted into the socket. Rotation of the nut brings the cams on its outer surface into engagement with the cams on the inner surface of the socket, the action of which is to urge the male and female members towards each other in the axial direction. This connector requires special members to be formed on both of the tubular bodies to be joined in order to provide the male and female members. Such a connector could not be used to join existing, standard members, such as risers and wellheads.

U.S. Pat. No. 3,986,729 discloses a connecting apparatus for releasably connecting with the end of a tubular member. The connector comprises a connector body having a seating surface for engaging with a complementary seating surface on the tubular member. The connector further comprises a discontinuous locking ring having a conical locking surface. The locking ring is expandable and contractible in a circumferential direction, allowing it to be moved into and out of engagement with a locking shoulder on the tubular member. In a one embodiment, the locking ring is carried by the connector body for engagement with a locking shoulder disposed on the outer surface of the tubular member. In a second, alternative embodiment, the locking ring is carried so as to be engagable by radially outwards movement with a locking shoulder disposed within the tubular member.

A pipe coupling is disclosed in U.S. Pat. No. 3,997,199 mountable on the external surface of a pipe. The coupling comprises a tapered compression ring and a split ring slip having a taper cooperating with that on the compression ring. A set screw is used to cause the split ring slip to move in an axial direction, the taper on the ring slip acting to urge the compression ring against the outer surface of a pipe place in the coupling. The pipe coupling of U.S. Pat. No. 3,997, 199 is secured, for example by welding, to the outside of the pipes being coupled, thereby leading to a significant increase in the diameter of the pipe assembly in the region of the coupling.

U.S. Pat. No. 4,049,297 discloses a pipe coupling apparatus also employing a series of tapered slips or collets. In the device of U.S. Pat. No. 4,049,297, a first elongated housing encloses tapered slips or collets, which work against a tapered portion of the inner surface of the first housing. Hydraulic pressure is used to drive a piston to slide the collets against the taper of the housing, in turn forcing the collets against the outer surface of a first pipe. A second housing encloses the end portion of a second pipe. A piston is disposed within the second housing in connection with a hydraulic system. The piston has a tapered portion, which, under the action of the hydraulic system, is moved to engage with a tapered clamping ring. The clamping ring is thereby moved to engage with suitably formed grooves in the exterior of the first and second pipes, in order to draw the ends of the pipes into contact. Again, the coupling of U.S. Pat. No. 4,049,297 is applied to the exterior of the pipes being coupled and relies upon profiles formed on the outside of the pipes, resulting in an increased diameter of the pipe assembly.

A tubular connector is also disclosed in U.S. Pat. No. 4,265,470. The connector requires a shoulder on the outer surface of a first tubular member to be connected. A collet extends around the outer surface of the first tubular member and engages with the shoulder. The collet comprises a plurality of axially extending fingers, having internal ridges for engaging with corresponding ridges in the outer surface of a second tubular member. A lock ring is used to secure the fingers of the collet into engagement with the ridges in the outer surface of the second member and is retained by a lock nut threaded onto the outside of the second member. This coupling requires the tubular members being connected to be machined in order to provide the essential elements of the connector assembly.

A further coupling disclosed in U.S. Pat. No. 4,372,584 comprises a male member and a female member for connection to the outside of respective first and second pipe sections. The male member comprises a locking member having a locking sleeve comprising a plurality of bendable locking fingers extending in an axial direction from the locking sleeve. A piston is provided to displace the free ends of the locking fingers radially outwards into engagement with the female member. The free ends of the locking fingers bear against an inner surface of the female member, with the effect of drawing the ends of the two pipe sections together. The female member is shaped to allow the locking fingers to be displaced to an over center position. The coupling disclosed in U.S. Pat. No. 4,372,584 is employed on the outside of the pipes being coupled, thus adding substantially to the overall diameter of the pipe assembly. The coupling dos not utilize existing profiles on the pipes being connected, in particular profiles on the interior surface of the pipes. In addition, it would appear that, once the locking fingers having moved into the over center position, there is no means for unlocking the coupling and disconnecting the pipes.

A wellbore lock system is disclosed in U.S. Pat. No. 5,617,918. The lock system comprises a radially moveable engagement member. The engagement member is moved from a first retracted position to a second extended position by a sleeve, the engagement member engaging with a profile formed in a subsurface nipple when in the second position. A seal assembly is provided, in which a seal is expanded radially outwards by an actuation assembly in order to seal the union against fluid leaks.

There remains a need for an improved apparatus to connect tubular members, such as pipes and subsea risers. It would be advantageous if the improved apparatus would be able to be configured in an arrangement of minimal diameter. Preferably, such an apparatus would engage with pre-existing profiles on the interior surface of an existing tubular member, for example a subsea wellhead. It would be further advantageous if such an apparatus could be operated remotely, for example from the sea surface, and be releasable when desired, in order to disconnect the tubular members. Finally, it would be advantageous if the apparatus could employ existing, conventional tubular members, such as pipes, risers wellheads and the like, without any modification being necessary to provide the essential working elements of the apparatus.

SUMMARY OF THE INVENTION

Surprisingly, it has now been found that an improved apparatus for connecting two tubular members, such as pipes and risers in oilfield applications, is one in which a locking member is provided and in which the locking member is first engaged to lock the two tubular members together to prevent relative axial movement between the two, and thereafter applying a tensioning axial load to the locking member, in order to urge the end portions of the tubular members together.

According to the present invention, there is provided, in a first aspect, a connector for connecting-a first tubular member to a second tubular member, the second tubular member having a seating surface and comprising an engagable locking profile, the connector comprising:

a housing for securing the connector to the end portion of the first tubular member, the housing comprising a seating surface for contacting the seating surface of the second tubular member;

a locking assembly having a locking portion engagable with the locking profile of the second tubular member, the locking assembly movable between an unlocked position, in which the locking portion of the locking assembly is not in engagement with the locking profile of the second tubular member, to a locked position, in which the locking portion of the locking assembly is engaged with the locking portion of the second tubular member and in which the seating surface of the housing is in contact with the seating surface of the second tubular member;

a first actuator operable to move the locking assembly from the unlocked position to the locked position;

a second actuator operable after operation of the first actuator to apply an axial tensile load to the locking assembly, thereby urging the seating surface of the housing against the seating surface of the second tubular member.

The locking portion of the locking assembly preferably engages with a locking profile disposed on the inner surface of the second tubular member. In this way, the overall diameter of the connector may be kept to a minimum, providing advantages in operations involving deep draft caisson vessels and tension leg platforms. The connector may be mounted onto the end of an existing tubular member, for example a riser, by means of a conventional means, such as a flange, with little or no modification of the existing installation being required.

In a preferred arrangement, the second actuator is operable only after the locking portion of the locking assembly is fully engaged with the locking portion of the second tubular member.

In a preferred embodiment, the locking portion of the locking assembly is moved in a radial direction when acted upon by the first actuator. In this arrangement, it is advantageous to have the locking assembly comprise a groove dog for engaging with a complementary running groove in the second tubular member when the locking assembly is in the locked position.

The first actuator preferably comprises a first actuator collar movable in the axial direction, the first actuator collar comprising an actuator portion, which acts upon the locking portion of the locking assembly when the collar is moved in an axial direction. The actuator portion may comprise a taper, which is brought into contact with the locking portion of the locking assembly when the first actuator collar is moved in an axial direction. Continued movement of the first actuator collar will cause the taper to urge the locking portion of the locking assembly into engagement with the locking profile of the second tubular member.

The locking assembly preferably comprises a loading portion, distanced from the locking portion of the locking assembly in the axial direction. The loading portion is operable upon by the second actuator to apply an axial tensile load to the locking assembly. In this arrangement, the second actuator preferably comprises a second actuator collar, which may be moved in an axial direction, thereby causing an axial tensile load to be applied to the locking assembly. The connector assembly preferably comprises a loading member, such as a loading ring, which applies the axial tensile load to the locking assembly when the second actuator collar is moved in an axial direction. The loading member may be provided such that a radial movement of the loading portion of the locking assembly caused by an axial movement of the second actuator collar causes the loading member to apply the aforementioned axial tensile load to the locking assembly. This may be achieved, for example, by providing a first taper on the loading portion of the locking assembly to cooperate with and act against a corresponding second taper on the loading member. The loading member is preferably a ring disposed radially outwards of the loading portion of the locking assembly. Radial movement of the loading portion of the locking assembly is conveniently provided by providing a taper on the second actuator collar which acts against the loading portion of the locking assembly when the second actuator collar is moved in an axial direction. The connector assembly preferably comprises a gasket disposed in the housing to provide a seal between the housing and the tubular member. In a preferred arrangement, the loading member is moveable in an axial direction under the action of applying an axial tensile load to the locking assembly. This axial movement of the loading member may be used to set the gasket and provide the seal between the housing and the second tubular member.

In a preferred embodiment, the locking assembly comprises a plurality of axially extending locking members, for example locking fingers, each locking member having a locking portion at a first end and a loading portion at a second end.

As noted, the first and second actuators preferably comprise first and second actuator collars. In a preferred embodiment, the first and second actuator collars are the first and second actuator portions of a single actuator collar. Axial movement of the actuator collar causes the first actuator portion to move the locking assembly from the unlocked position to the locked position. Continued movement of the actuator collar in the axial direction causes the second actuator portion to cause an axial tensile load to be applied to the locking assembly.

The locking assembly is preferably biased into the unlocked position. This may be achieved by providing a resilient biasing member, for example a split ring disposed in a circumferential groove radially outwards of the locking assembly, the first actuator having to act to compress the split ring in the groove in order to move the locking portion of the locking assembly into engagement with the locking profile of the second tubular member.

The locking assembly is preferably moveable from the locked position to the unlocked position, in order to disconnect the first and second tubular members. In the embodiments discussed above, in which the first and second actuators comprise separate actuator collars or separate portions of a single actuator collar, it is convenient if movement of the collar or collars in one axial direction moves the locking assembly from the unlocked position to the locked position and thereafter causes an axial tensile load to be applied to the locking assembly. Movement of the collar or collars in the reverse axial direction will first release the axial tensile load being applied to the locking assembly and, thereafter, allow the locking assembly to move into the unlocked position. In a preferred arrangement, the connector assembly is provided with means, for example a hydraulic system, for applying a first force to move the locking assembly into the locked position and a second force to return the locking assembly to the unlocked position. In the interests of safety, it is preferred that the arrangement allows a greater force to be applied to move the locking assembly into the unlocked position.

The connector preferably comprises an override assembly, by which the locking assembly may be moved into the unlocked position. This may be accomplished by a remote means, for example by a remotely operated submersible vehicle in subsea locations, and is preferably independent of the primary system by which the locking assembly is moved into the locked and unlocked positions. The override system may comprise a lock for securing the locking assembly in the locked position. In a preferred embodiment, the override system comprises an indicator, visible from outside the connector assembly, to indicate the position of the locking assembly within the connector.

The connector assembly preferably comprises a centralizing ring for centrally locating the position of the first tubular member with respect to the second tubular member. The connector assembly is preferably arranged such that a couple is generated between the centralizing ring and the region of contact of the seating surface of the housing and the seating surface of the second tubular member. The couple, once formed, will resist bending moments applied to the connection when in use.

In a preferred embodiment, fluid pressure within the second tubular member, such as the downhole pressure present in a wellhead, biases the locking assembly into the locked position.

In a further aspect, the present invention provides a method of connecting a first tubular member to a second tubular member, the second tubular member having an engagable profile and a seating surface, which method comprises:

providing a connector assembly comprising a seating surface and a locking member having a locking portion;

connecting the connector assembly to an end of the first tubular member;

engaging the locking portion of the locking member with the engagable profile of the second tubular member, the locking member thereby retaining the seating surface of the connector assembly in contact with the seating surface of the second tubular member; and thereafter applying an axial tensile load to the locking assembly to urge the seating surface of the connector assembly into contact with the seating surface of the second tubular member.

Preferably the locking assembly engages with an engagable profile disposed on the inner surface of the second tubular member. In this way, the diameter of the connector assembly may be kept to a minimum, as discussed hereinbefore.

The locking portion of the locking assembly is preferably moved in a radial direction to engage with the locking profile of the second tubular member. In the case in which the profile being engaged is on the inner surface of the second tubular member, the locking portion of the locking assembly is moved radially outwards into engagement with the locking profile, in order to lock the first and second tubular members together.

The locking assembly preferably comprises a loading portion moveable in a radial direction, whereby radial movement of the loading portion causes an axial tensile load to be applied to the locking assembly. Again, when the profile being engaged by the locking portion of the locking assembly is on the inner surface of the second tubular member, the loading portion is preferably moved in a radially outwards direction in order to apply the axial tensile load to the locking assembly.

The axial tensile load is preferably applied to the loading portion of the locking assembly by a loading member, for example a loading ring. The axial tensile load may be applied by the interaction of a first taper on the loading portion of the locking assembly and a second taper on the loading member. The loading member is preferably moved in an axial direction under the action of applying the axial tensile load to the locking assembly. In this way, the loading member may be used to set a gasket retained in the connector assembly and thereby effect a seal between the connector assembly and the second tubular member.

BRIEF DESCRIPTION OF THE DRAWINGS

The present invention will be more fully understood from the following description of preferred embodiments of the invention, having reference to the accompanying drawings, in which.

It is to be noted, however, that the appended drawings illustrate only typical embodiments of the present invention and are therefore not to be considered a limitation of the scope of the invention, which includes other equally effective embodiments.

DESCRIPTION OF THE PREFERRED EMBODIMENTS OF THE INVENTION

Figure 1:
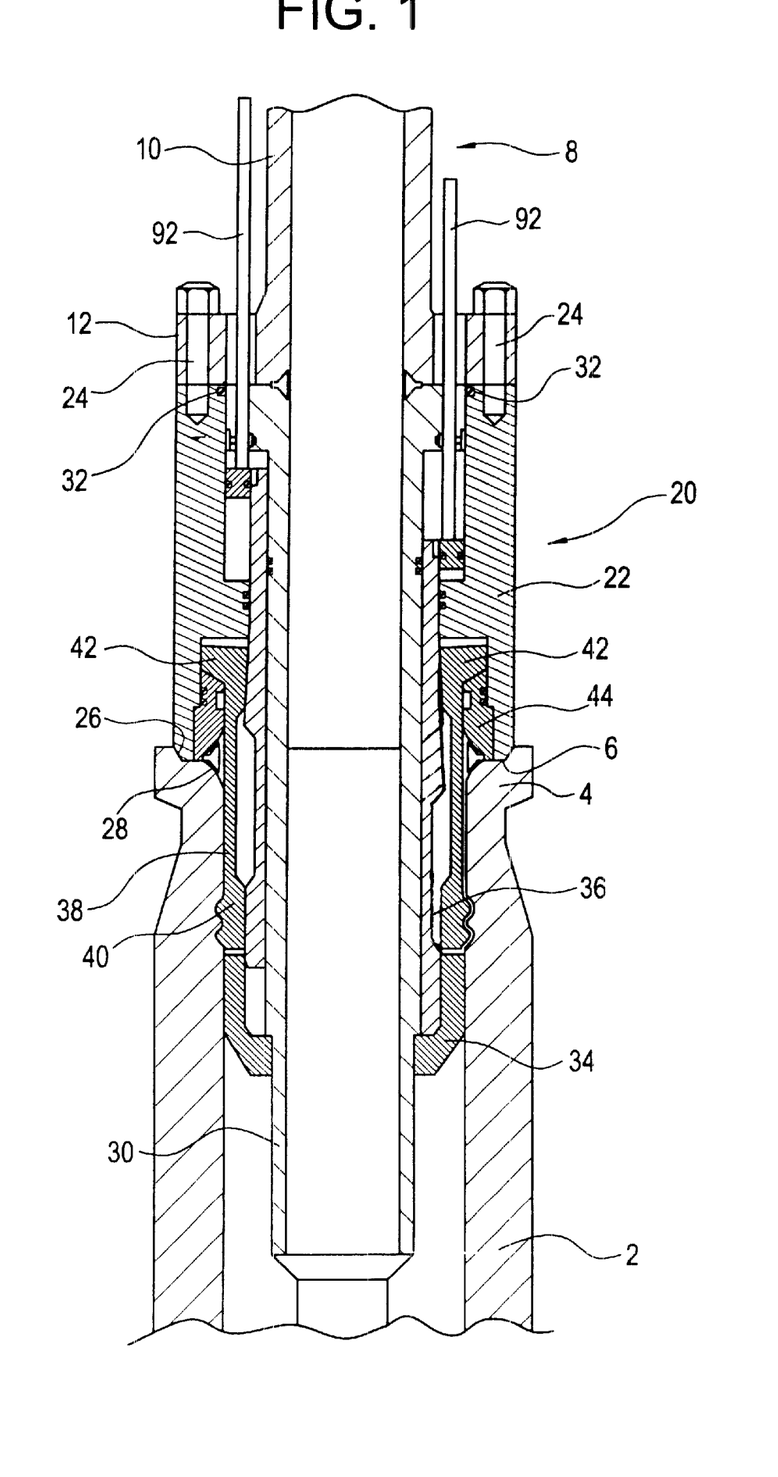
FIG. 1 is a cross-sectional side elevation of one embodiment of the connector assembly of the present invention in place on the end of a riser and located in the upper end of a wellhead assembly, the portion of the drawing to the right of the center line showing the connector assembly with the locking assembly in the unlocked position, and the portion of the drawing to the left of the center line showing the connector assembly with the locking portion in the locked position.

Referring to FIG. 1, a tubular wellhead 2 of standard design and configuration is shown. The wellhead 2 has an upper portion 4, often referred to as a hub having a seating surface 6 in its end surface. A stress joint, generally indicated as 8, comprises a tapered tube 10, such as a riser, of standard configuration having a flange 12 mounted to its end portion. The flange 12 may be of standard design or, as shown in FIG. 1, require minor modification to accommodate the override rods (as discussed hereinafter).

A connector assembly, generally indicated as 20, comprises a generally cylindrical connector housing 22. The connector housing 22 is mounted at a first end to the flange 12 by means of bolts 24. A second end of the connector housing 22 comprises a seating surface 26 shaped to contact and seat on the seating surface 6 on the end surface of the wellhead 2. A gasket 28 is disposed on the inner side of the second end of the connector housing 22 to effect a seal between the housing 22 and the wellhead 2.

The connector assembly 20 further comprises a tubular central member 30 extending concentrically within the connector housing 22 and into the wellhead 2. The central member 30 is mounted to the connector housing 22 at its first end by means of a split ring retainer 32 comprising a split ring located in an annular groove in the inner surface of the connector housing 22 adjacent its first end and engaging with a corresponding shoulder formed in the outer surface of the central member 30. The inner diameter of the central member 30 is substantially the same as the inner diameter of the riser tube 10. Production tubing is run through the bore of the riser 10 and the connector into the wellhead and the formation below. The bore of the suspended tubing will form a flow path for fluid from the well. An annulus is formed through the wellhead 2 through the central member 30 to the riser tube 10 with the outside of the production tubing, once in place in the well.

A centralizing ring 34 is disposed in the annular cavity formed between the central member 30 and the inner surface of the wellhead 2. The centralizing ring 34 is in the form of a cylindrical bowl, that is substantially L-shaped in cross-section and oriented with the base of the L-shape innermost within the bore of the wellhead 2. In this way, a closed annular cavity is formed, defined by the inner surfaces of the wellhead 2 and the connector housing 22, the first end of the connector housing 22 and the centralizing ring 34.

An actuator collar 36 is disposed within this closed annular cavity around the central member 30 and is slideable from a first position, as shown in the right hand portion of FIG. 1, to a second position, as shown in the left hand portion of FIG. 1. A locking assembly comprises a plurality of locking members 38 disposed in the aforementioned annular cavity between the outer surface of the actuator collar 36 on one side and the inner surfaces of the connector housing 22 and the wellhead 2 on the second side. Each locking member 38 comprises a locking portion 40 at a first end disposed innermost within the wellhead 2. A loading portion 42 is disposed at the second end of each locking member. A loading member, in the form of a loading ring 44 is disposed within the aforementioned annular cavity adjacent the gasket 28 between the loading portion 42 of the locking members 38 and the inner surface of the connector housing 22. The details and operation of the actuator collar 36, the locking members 38 and the loading ring 44 will be described with reference to FIGS. 2a, 2b and 2c.

Figure 2A:
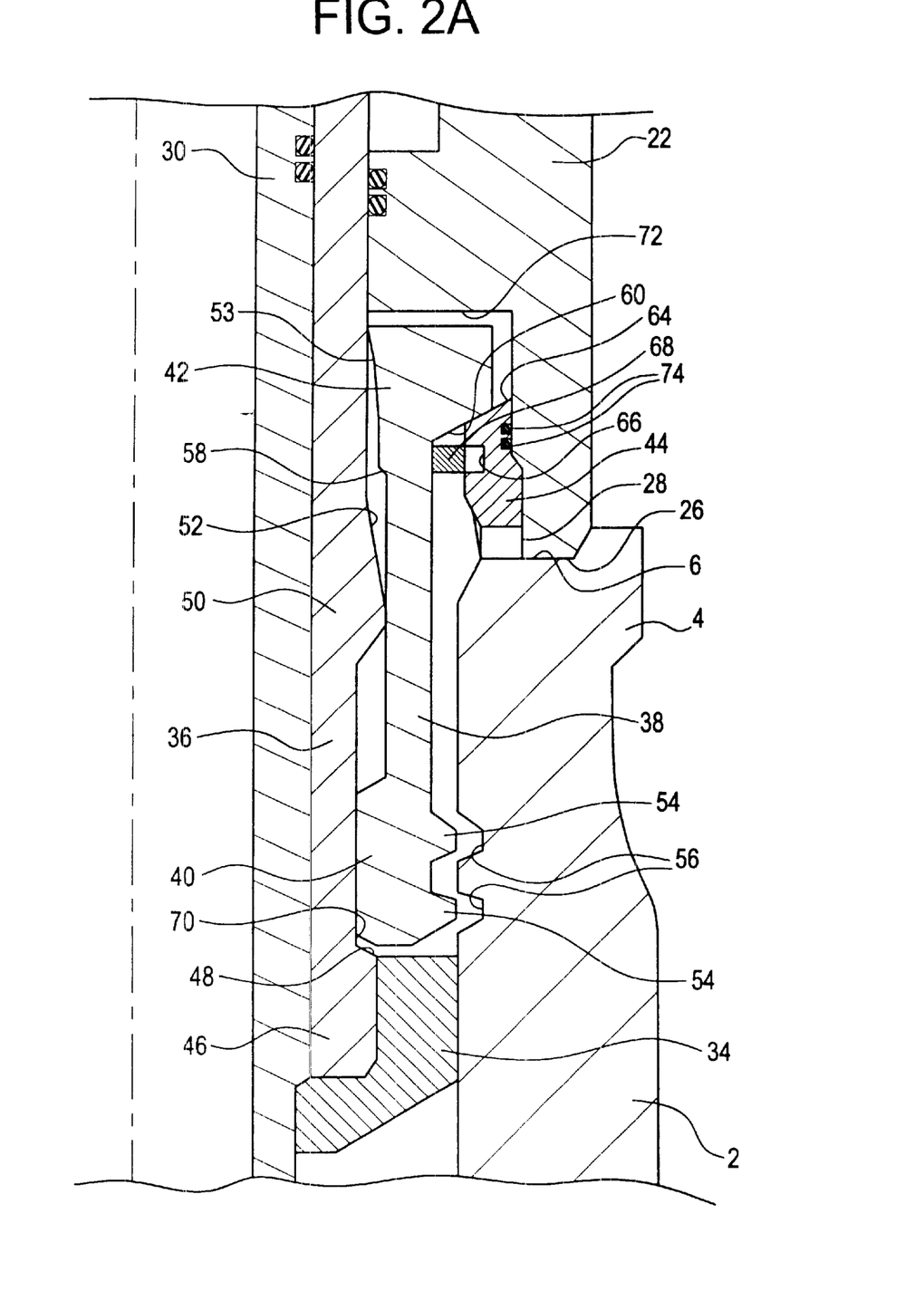
FIG. 2a is a detailed cross-sectional side elevation of part of the embodiment of FIG. 1 with the locking assembly in the unlocked position.

Referring first to FIG. 2a, the actuator collar 36 is shown in the first position, in which the locking members 38 are in the unlocked position. The actuator collar 36 comprises a first actuating or locking portion 46 at its end innermost within the wellhead 2, shown adjacent the centralizing ring 34 in FIG. 2a. The locking portion 46 of the actuator collar 36 comprises a region of increased thickness, terminated by a tapered surface 48 facing the locking portion 40 of each locking member 38. The actuator collar comprises a second actuating or loading portion 50 formed as a region of increased thickness distanced from the locking portion 46 of the actuator and disposed adjacent each locking member 38 midway between the locking portion 40 and loading portion 42 of the locking member. The region of increased thickness forming the loading portion 50 of the actuator collar 36 is terminated by a tapered surface 52 facing the loading portion 42 of each locking member. The loading portion 42 of each locking member 38 is formed with a tapered surface 53 opposing the outer surface of the actuator collar 36. The tapered surface 53 on the loading portion 42 of the locking member 38 has a taper corresponding to the taper of the surface 52 on the loading portion 50 of the actuator collar 36, such that, when in contact, the tapered surfaces 52 and 53 are substantially parallel to one another.

As noted above, each locking member 38 comprises a locking portion 40 at a first end and a loading portion 42 at its second end. The locking portion 40 is formed with a region of increased thickness extending towards the actuator collar 36, such that the locking portion 40 of each locking member 38 is in contact with the outer surface of the actuator collar 36 adjacent the locking portion 46 of the actuator collar 36. The outer surface of the locking portion 40 of each locking member 38 is formed with one or more dogs 54. The dogs 54 are formed in shape and number to conform to one or more running grooves 56 formed on the inner surface of the wellhead 2. Such running grooves are commonly formed in wellhead assemblies. The connector assembly 20 in general, and the actuator collar 36 and locking members 38 in particular, are sized such that when the connector housing 22 is seated on the end of the wellhead 2, the dogs 54 of the locking portion of each locking member 38 align with the running grooves 56 in the inner surface of the wellhead 2.

The loading portion 42 of each locking member 38 is formed as a region of increased thickness, extending both radially inwards towards the actuator collar 36 and radially outwards towards to inner surface of the connector housing 22. A first tapered surface 58 is formed on the inner surface of the loading portion 42 of the locking member 38 facing and axially aligned with the tapered surface 52 on the loading portion 50 of the actuator collar 36. A second tapered surface 60 is formed on the outer surface of the loading portion 42 of each locking member 38 facing in an axial direction towards the wellhead 2. The loading ring 44 is present within the connector assembly disposed between the tapered surface 60 of the loading portion 42 of each locking member 38 and the seating surface 6 on the end of the wellhead 2. As shown in FIG. 2a, the loading member consists of the loading ring 44 separate from and moveable independently with respect to the connector housing 22. However, the loading member may be formed integrally with the connector housing 22. The surface 64 of the loading ring 44 facing the loading portion 42 of the locking member 38 is formed with a taper. The surface of the loading ring 44 facing radially inwards is formed with a retaining groove 66, within which is retained a sprung split ring 68. The split ring 68 is in contact with the outer surface of each locking member 38 and biases the locking members 38 into the unlocked position shown in FIG. 2a. The retaining groove 66 is sized to allow the split ring to move radially outwards and accommodate a greater portion of the ring than required in the unlocked position.

The connector assembly 20 preferably comprises a plurality of locking members 38. These are conveniently machined together from a solid cylinder, after which the resulting piece is split to provide the requisite number of individual locking members. Preferably, three or four locking members 38 are arranged to each quadrant, giving a total of from twelve to sixteen locking members in the complete connector assembly 20.

Figure 2B:
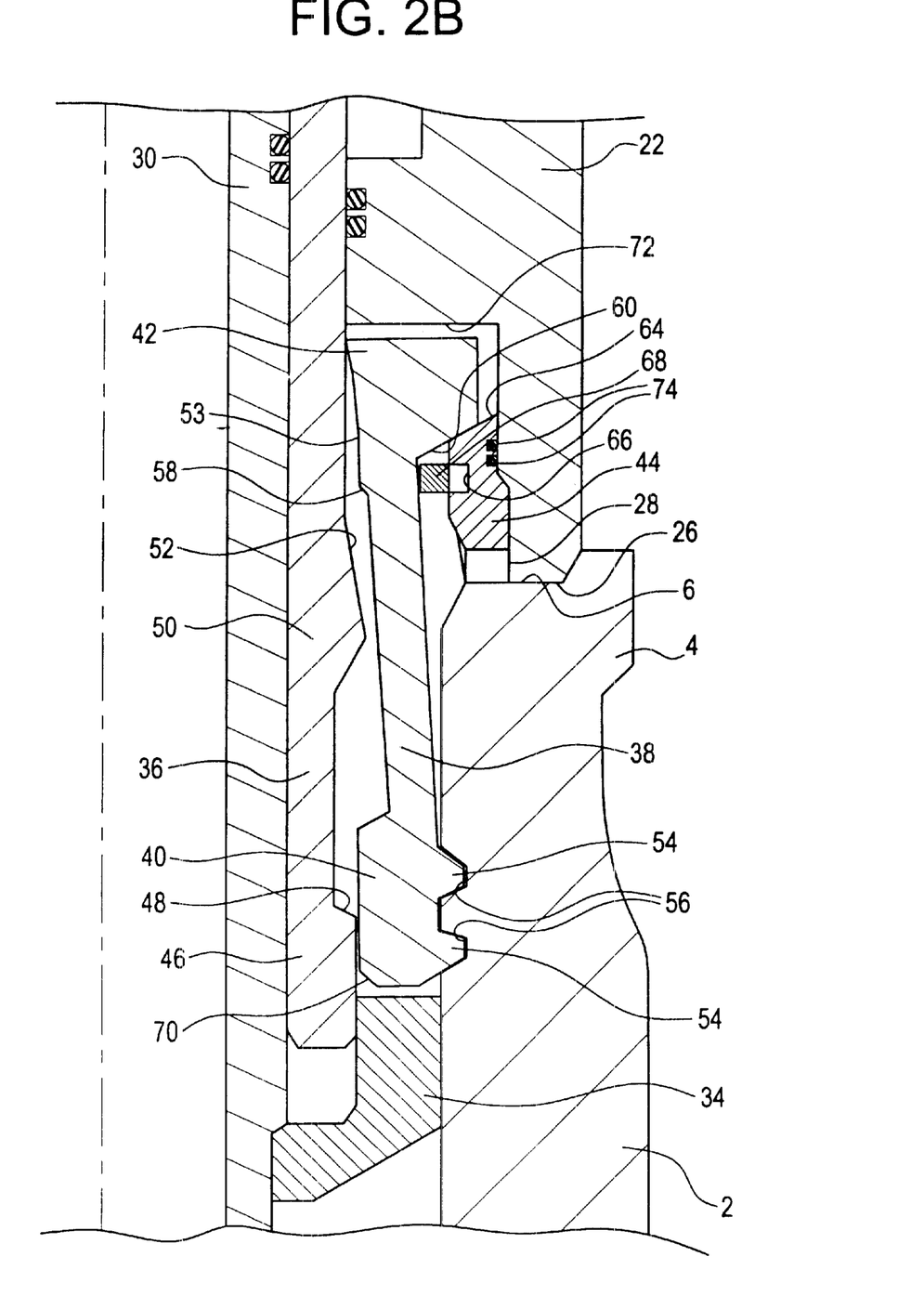
FIG. 2b is the detailed cross-sectional side elevation of FIG. 2a, with the locking assembly in an intermediate position.
Figure 2C:
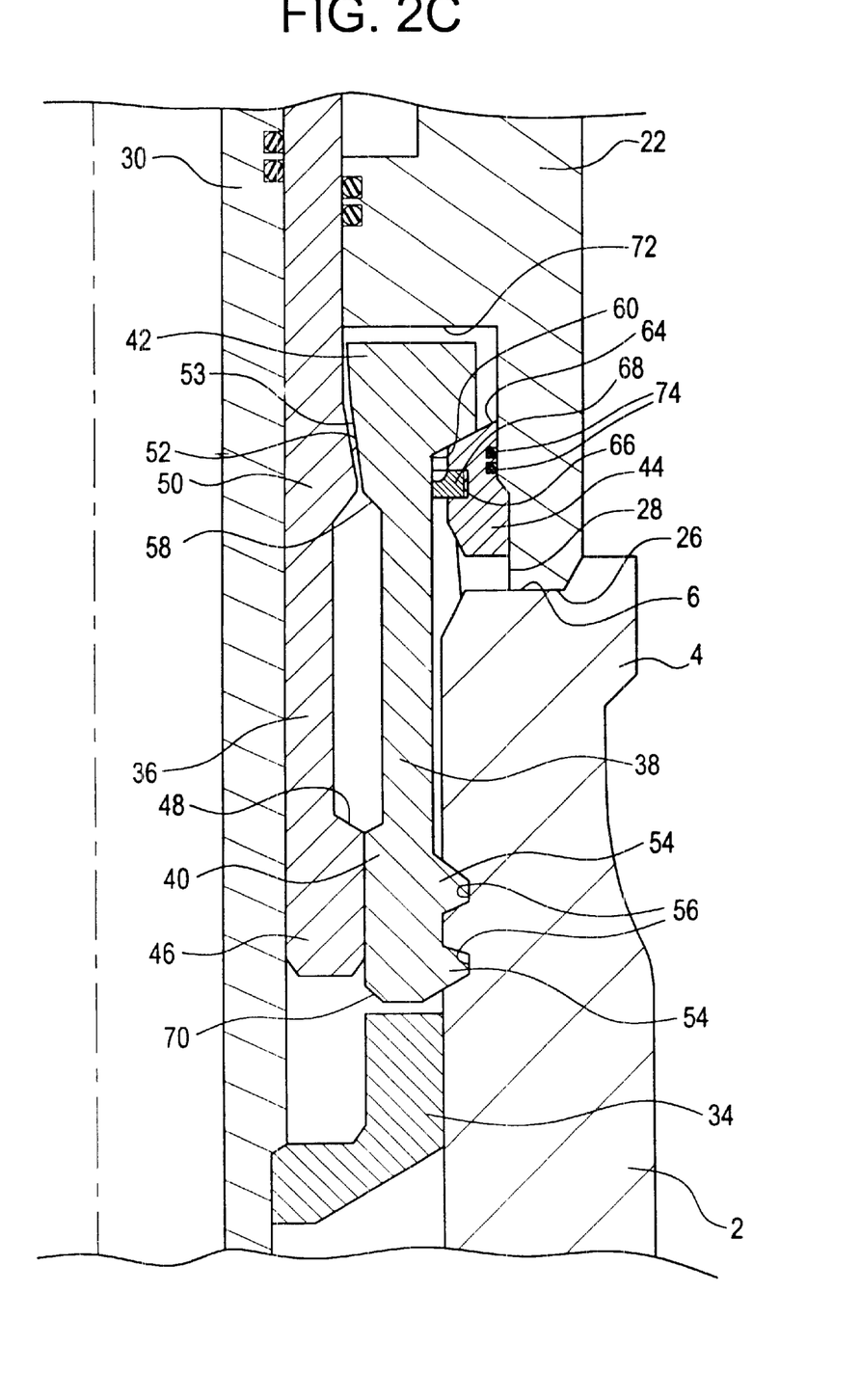
FIG. 2c is the detailed cross-sectional side elevation of FIG. 2a, with the locking assembly in the locked position.

The operation of the actuator collar 36, the locking members 38 and the loading ring 44 will now be described with reference to FIGS. 2a, 2b and 2c.

As shown in FIG. 2a and discussed above, in the unlocked position, the split ring 68 in the loading ring 44 biases the locking members 38 into the unlocked position, that is with the locking portion 40 and loading portion 42 of each locking member 38 held against the outer surface of the actuator collar 36 and with the dogs 54 on the locking portion 40 of each locking member 38 held at a distance from the running grooves 56 in the inner surface of the wellhead 2. It is in this position that the connector assembly 20 may be engaged with the end portion of the wellhead 2, such that the seating surface 26 on the second end of the connector housing 22 is seated on the seating surface 6 of the end of the wellhead 2. As noted above, with the connector assembly 20 engaged in this manner with the wellhead 2, the dogs 54 on the locking portion 40 of each locking member 38 align with the running grooves 56 on the inner surface of the wellhead 2.

To lock the connector assembly 20 in place on the wellhead 2, the actuator collar 36 is moved in an axial direction away from the wellhead 2 by means described hereinbelow. Movement of the actuator collar 36 in this manner will first give rise to the situation shown in FIG. 2b. In the position shown in FIG. 2b, an intermediate position, the locking members 38 have been moved out of the unlocked position. Axial movement of the actuator collar 36 away from the centralizing ring 34 brings the tapered surface 48 of the locking portion 46 of the actuator collar 36 into contact with the end of the locking portion 40 of each locking member 38. Continued movement of the actuator collar 36 causes the locking portion 40 of each locking member 38 to ride along the tapered surface 48 urging the locking portion 40 of each locking member 38 radially outwards against the bias of the split ring 68. In this way, the dogs 54 on the outer surface of the locking portion 40 of each locking member 38 are caused to engage with the running grooves 56 on the inner surface of the wellhead. The inner edge of the locking portion 40 of each locking member 38 may be formed with a chamfer 70 to assist the action of the locking portion 46 of the actuator collar 36 in moving the locking portion 40 of the locking members 38 radially outwards against the bias of the split ring 68. The tapered surface 48 on the locking portion 46 of the actuator collar 36 and the chamfer 70 on the inner edge of the locking portion 40 of the locking members 38, if present, is formed with an angle such that the movement of the locking portion 40 of the locking members 38 radially outwards is rapid, in turning causing a rapid engagement of the dogs 54 with the running grooves 56 of the wellhead 2. The tapered surface 48 of the locking portion 46 of the actuator collar is preferably at an angle of from 40° to 50°, more preferably at an angle of about 45°. It is preferred that the dogs 54 are fully engaged with the running grooves 56 by the locking portion 46 of the actuator collar 36, before the actuator collar 36 acts further on the locking members 38. The split ring 68 retained in the loading ring 44 continues to act on the outer surface of each locking member 38 and bias the loading portion 42 of each locking member 38 radially inwards away from the connector housing 22 and against the outer surface of the actuator collar 36. In this position, there is no axial tensile load being applied to the locking members.

Continued movement of the actuator collar 36 axially away from the centralizing ring 34 causes the locking members 38 to move to the locked position as follows. Referring to FIG. 2c, continued movement of the actuator collar 36 causes the locking portion 46 of the actuator collar 36 to retain the locking portion 40 of the locking members 38 in the radially outwards position, holding the dogs 54 in engagement with the running grooves 56 in the wellhead. In addition, the continued movement of the actuator collar 36 brings the tapered surface 52 of the loading portion 50 of the actuator collar into contact with the tapered surface 58 on the inner surface of the loading portion 42 of each locking member 38. Further movement of the actuator collar in the axial direction causes the tapered surface 58 and the loading portion 42 of each locking member 38 to ride radially outwards on the tapered surface 52 of the loading portion 50 of the actuator collar 36. This radial movement of the loading portion 42 of each locking member 38 in turn causes the tapered surface 60 on the outer surface of the loading portion 42 of each locking member 38 to ride against the opposing tapered surface 68 on the loading ring 44. The interaction of the two tapered surfaces 60 and 64 is to cause the loading ring 44 to apply a tensile force on each locking member 38 in the axial direction away from the engaged dogs 54 and running grooves 56. A clearance 72 is maintained between the end of each locking member 38 and the connector housing 22 in order to prevent the locking assemblies from becoming irreversibly locked in the locked position.

The action of the loading portion 50 of the actuator collar 36 to move the loading portion 42 of the locking members 38 is against the bias of the split ring 68. Under this action, the split ring 68 is forced radially outwards and into the retaining groove 66 in the loading ring 44.

As noted above, the interaction of the loading portion 42 of each locking member 38 with the loading ring 44 is to apply an axial tensile force on each locking member 38 in the direction away from the dogs 54 engaged in the running grooves 56. The reaction to this force results in the movement of the loading ring 44 axially towards the end of the wellhead 2. This movement of the loading ring 44 causes it to compress the gasket 28 and set it against the seating surface 6 of the end of the wellhead 2, completing the seal between the seating surface 26 of the connector housing 22 and the seating surface 6 of the wellhead 2.

Seals 74 are retained in circumferential grooves in the outer surface of the loading ring 44 to provide a seal between the loading ring 44 and the inner surface of the connector housing 22.

As discussed above, the axial tensile load is applied to the locking members 38 by the action of the tapered surface 52 of the loading portion 50 of the actuator collar 36 on the inner surface of the loading portion 42 of each locking member 38 and by the interaction of the opposing tapered surfaces 60 and 64 on the loading portion 42 of each locking member 38 and the loading ring 44 respectively. The angle of the tapered surfaces 52 and 60 are selected to provide the best mechanical advantage for tensioning the locking members 38. Typically, the surface 52 on the loading portion 50 of the actuator collar will be at an angle of from 2° to 10°, preferably from about 3° to 5° to the longitudinal axis of the connector assembly. An angle of 4° to the longitudinal axis is particularly preferred for the surface 52 on the loading portion 50 of the actuator collar 36. A taper at a corresponding angle is formed on the inner surface 53 of the loading portion 42 of each locking member 38, such that the tapered surfaces 52 and 53 are substantially parallel when in contact in the locked position.

The surface 60 of the loading portion 42 of each locking member 38 may be at an angle in the range of from 15° to 40°, preferably from about 20° to 30° to a radial line perpendicular to the longitudinal axis of the connector assembly. An angle of 25° to the radial line is especially preferred.

With the well in operation, in particular when producing hydrocarbons, fluid at a superatmospheric pressure will be present in the wellhead 2. Fluid under pressure in the wellhead 2 will leak past the centralizing ring 34 and apply pressure to the end of the actuator collar 36 within the wellhead 2. This pressure will act to urge the actuator collar 36 out of the wellhead 2, that is to urge the actuator collar into the locked position. In this way, fluid pressure in the wellhead 2 acts to increase the integrity of the connection between the riser 8 and the wellhead 2.

As will be appreciated from FIG. 1, the connector assembly 20 is in contact with the wellhead 2 in two regions. The first region of contact is defined by the contact between the seating surface 6 on the end of the wellhead 2 and the seating surface 26 on the second end of the connector housing 22. The second region of contact is defined by the area of contact between the outer surface of the centralizing ring 34 and the inner surface of the wellhead 2. These two regions of contact are spaced apart in the axial direction. When the connector assembly 20 is in the locked position, with the locking members 38 under tension, a couple is formed between the aforementioned two regions of contact. The couple improves the resistance of the connection between the riser 8 and the wellhead 2 to bending moments and stresses.

In cases in which it is desired to disconnect the riser 8 from the wellhead 2, the connector assembly of the present invention provides the advantage that it may be swiftly unlocked. To unlock the connector assembly, the actuator collar 36 is moved in the opposite direction to that previously described, that is the collar 36 is moved axially towards the wellhead 2. In a first stage this has the effect of allowing the loading portion 42 of each locking member 38 to move radially inwards under the biasing action of the split ring 68. This releases the axial tensile load applied to the locking members 38. In this way, the assembly is moved from the locked position shown in FIG. 2c to the intermediate position shown in FIG. 2b. Continued movement of the actuator collar 36 frees the locking portion 40 of each locking member 38, allowing the dogs 54 to be moved radially inwards under the biasing action of the split ring 68 and out of engagement with the running grooves 56 in the wellhead. The riser 8, together with the connector assembly 20, may then be moved away from the wellhead 2.

Figure 3:
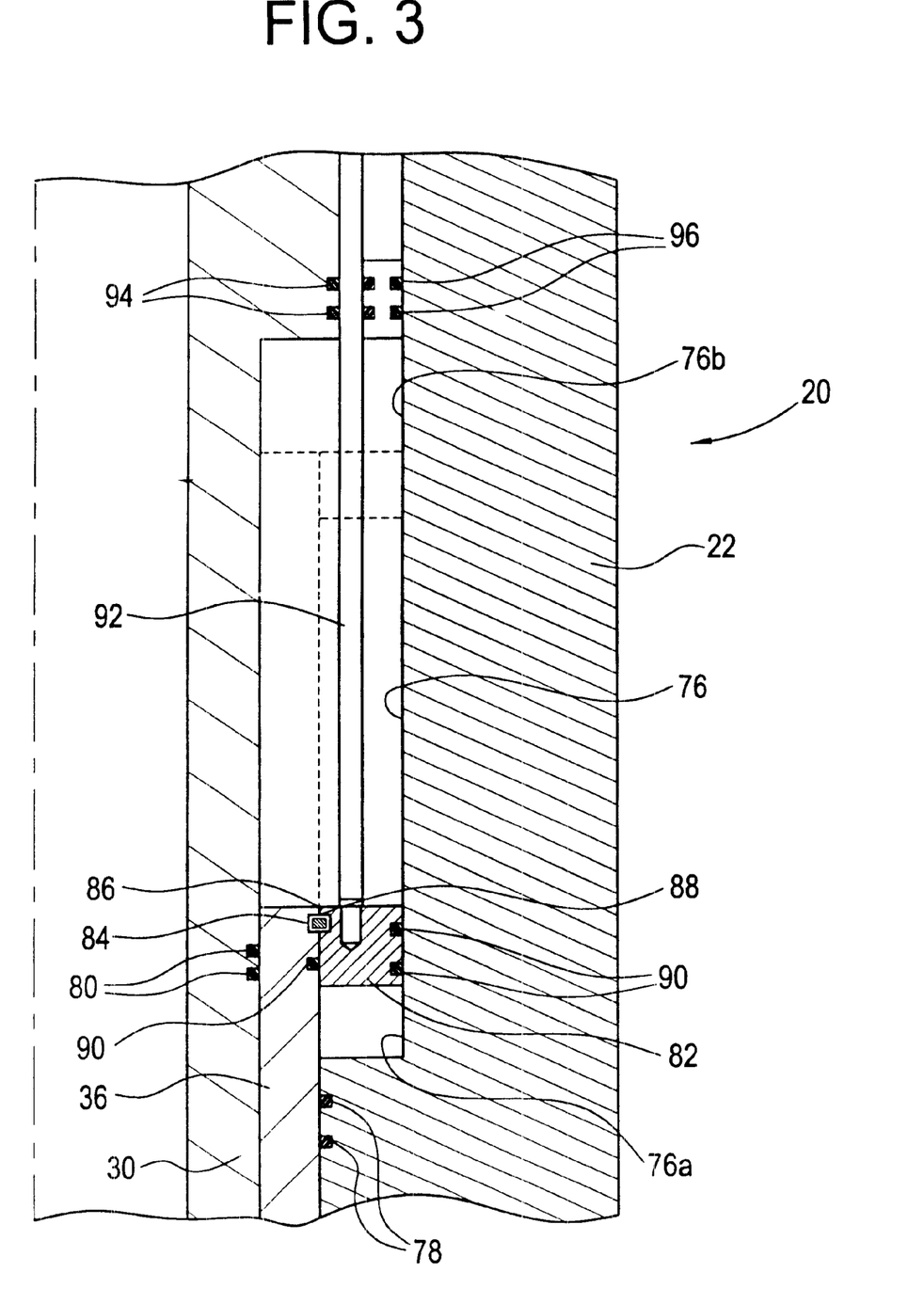
FIG. 3 is a detailed cross-sectional side elevation of part of the embodiment of FIG. 1 showing the means for moving the connector assembly between the locked and unlocked positions.

The actuator collar 36 may be moved by any suitable conventional means. In the preferred embodiment, the actuator collar 36 is moved in the axial directions to lock and unlock the connector assembly by means of a pressurized hydraulic fluid acting on a piston within the connector housing. Referring to FIG. 3, a detailed view of the piston assembly is shown, in which an annular hydraulic cavity 76 is formed between the outer surface of the central member 30 and the connector housing 22. The end portion of the actuator collar 36 extends into the hydraulic cavity 76. Seals 78 are provided to form a fluid-tight seal between the actuator collar 36 and the connector housing 22, preventing hydraulic fluid from leaving the hydraulic cavity 76 or fluid from the wellhead 2 entering the hydraulic cavity 76 and contaminating the hydraulic fluid. Similarly, seals 80 are provided to form a seal between the inner surface of the actuator collar 36 and the outer surface of the central member 30.

A piston 82, in the form of a piston ring, is secured to the end portion of the actuator collar 36 flush with the end face. The piston 82 is mounted to the actuator collar 36 by means of a sprung retaining ring 84 located in opposing grooves 86 and 88 in the actuator collar 36 and the piston 82 respectively. Seals 90 located in grooves in the piston 82 provide a seal between the piston 82 and the inner surface of the connector housing 22 and between the piston 82 and the actuator collar 36. In this way, the piston assembly divides the hydraulic cavity 76 into two cavity portions 76a and 76b of variable volume.

An override rod 92 is secured at one end to the piston 82 by a threaded connection and extends axially through the hydraulic cavity portion 76b, through a bore in the central member 30 and a bore in the flange 12 on the riser tube 10. Seals 94 disposed in the central member around the bore through which the override rod 92 passes prevent the escape of hydraulic fluid from hydraulic cavity 76b. As shown in FIG. 1, the override rod 92 extends out of the connector assembly 20 through the flange 12, and provides the functions described hereinafter.

Seals 96 provided in grooves in the outer surface of the central member 30 in contact with the connector housing 22 and prevent the loss of hydraulic fluid from the hydraulic cavity 76b.

The assembly shown in FIG. 3 is in the unlocked position, as it would be when the connector assembly 20 is first introduced into a wellhead 2 in order to provide a connection between the wellhead 2 and the riser assembly 8. In operation, hydraulic fluid is provided from an external source (not shown) through a port (not shown) into the hydraulic cavity portion 76a. The hydraulic fluid may be supplied by conventional means, for example by hydraulic fluid supply pipes known in the art, or by a remotely operated vehicle (ROV). The pressure of the hydraulic fluid acts upon the surface of the piston 82, forcing the piston 82 and the actuator collar 36 to move along the hydraulic cavity 76, thus moving the assembly into the locked position. The position of the piston 82 and actuator collar 36 when the assembly is in the locked position is shown by dotted lines in FIG. 3. To return the assembly to the unlocked position, hydraulic fluid is supplied from a remote source (not shown) through a port (not shown) into the hydraulic cavity portion 76b. The pressure of the hydraulic fluid acts on the surface of the piston 82 and the end surface of the actuator collar 36, forcing the piston 82 and actuator collar in the reverse direction along the hydraulic cavity 76. At this point, it should be noted that the area upon which the hydraulic acts when moving the piston assembly to the unlocked position is the combined area of the piston 82 and the end surface of the actuator collar 36. This is to be compared with the area upon which the hydraulic fluid acts when locking the assembly, that is just the surface area of the piston 82 alone. In this way, the force applied to the piston assembly to move the connector assembly to the unlocked position is greater than the force applied to move the connector assembly into the locked position.

The override rod 92 is optional and not essential for the operation of the connector assembly. However, the presence of the override rod 92 provides a number of advantages. If an override rod 92 is present, as shown in FIGS. 1 and 3, the flange 12 on the riser tube 10 may require a minor amount of modification, in order to provide a bore through which the override rod can pass. If an override rod 92 is to be employed, it is preferred that the rods are present in pairs, at least one pair being provided. The override rod 92 may be used to perform a number of functions. First, the override rod provides a means by which the hydraulic system may be overridden and the connector assembly moved into the unlocked position by an external means. A motor or other means may be provided to act on the exposed portion of the override extending out from the flange 12. Alternatively, the override rod may be formed to be operable by a remotely operated vehicle (ROV), commonly used in subsea oilfield operations. In addition, the exposed portion of the override rod may act as a position indicator for the connector assembly, providing an indication of whether the assembly is in the locked or unlocked position. As can be seen from FIG. 1, the exposed portion of the override rod 92 is greater in length when the assembly is in the locked position, as indicated in the left hand portion of FIG. 1. This provides a visual indication of the position of the connector assembly.

The connector assembly is preferably provided with a means for retaining the assembly in the locked position. In a first embodiment, the hydraulic fluid supply system may be provided with a non-return valve, which when activated prevents hydraulic fluid from leaving the hydraulic cavity 76a once the assembly is in the locked position. Opening of the non-return valve would be required in order for the assembly to be moved into the unlocked position. In an alternative, a lock may be provided to act on the override rod 92. Such a lock may be provided on the exterior of the connector assembly, allowing it to be operated remotely, for example using an ROV.

Figure 4:
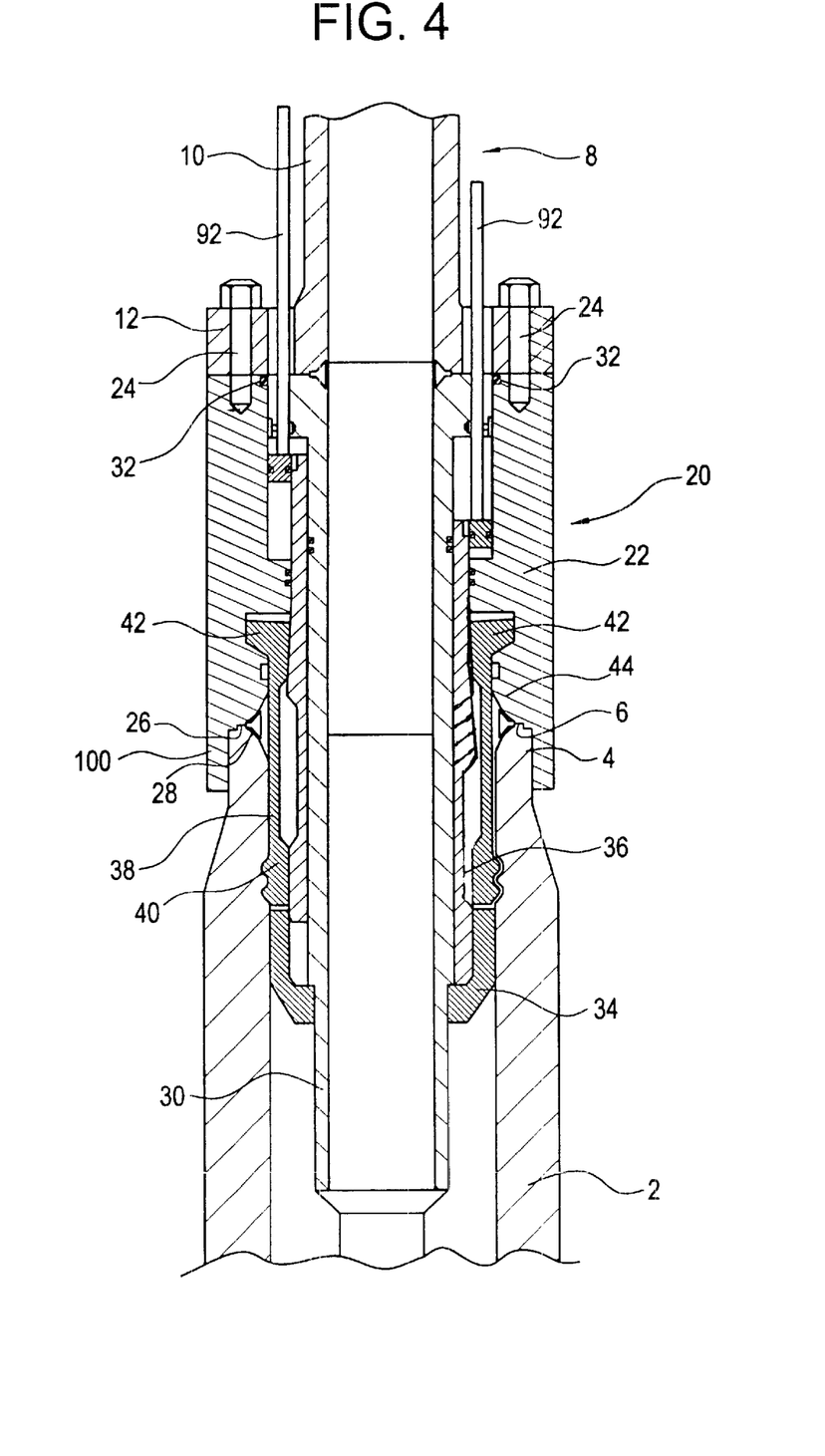
FIG. 4 is a detailed cross-sectional side of a second embodiment of the connector assembly of the present invention in place on the end of a riser and located in the upper end of a wellhead assembly, the portion of the drawing to the right of the center line showing the connector assembly with the locking assembly in the unlocked position, and the portion of the drawing to the left of the center line showing the connector assembly with the locking portion in the locked position.

Referring to FIG. 4, a second embodiment of the connector of the present invention is shown in place on a subsea wellhead assembly. The components common to the first embodiment shown in FIG. 1 and the second embodiment shown in FIG. 4 are identified using the same reference numerals and are as described above with respect to FIG. 1.

As shown in FIG. 4, the wellhead 2 has an end portion 4 that is substantially tubular in form, commonly referred to in the art as a mandrel. The connector housing 22 comprises a seating surface 26 shaped to contact and seat on the seating surface 6 on the end portion 4 of the mandrel wellhead 2. In addition, the connector housing 22 has a tubular extension 100, extending from its end adjacent the wellhead 2 around the end portion 4 of the wellhead.

Referring to the loading ring 44 in the embodiment shown in FIG. 4, this is formed as an integral part of the connector housing 22. This arrangement reduces the number of seals required, in order to seal the end of the connector housing 22 against the end portion 4 of the wellhead 2, and, for this reason, may be a preferred embodiment.

The connector of the present invention has been described above and shown in the figures in use in the connection of riser to a subsea wellhead. However, it will be appreciated that the connector of the present invention finds use in a wide range of applications in which it is required to connect two pipes or other tubular members together. As already noted, the connector assembly is of particular advantage when it is desired to utilize profiles existing on the inside of a tubular member in order to secure the connection, in which case the overall diameter of the connector assembly may be kept to a minimum. Other applications include connecting tubular structural members, such as the legs of tension leg platforms. While the accompanying drawings show the connector assembly of this invention being used to connect a riser and a wellhead in a substantially vertical arrangement, it will be appreciated that the connector assembly may be employed to connect tubular members in any orientation.

While the particular embodiments of the connector assembly of the present invention as herein disclosed are fully capable of obtaining the objects and advantages herein stated, it is to be understood that they are merely illustrative of the presently preferred embodiments of the invention and that no limitations are intended by the details of construction or design shown herein other than as described in the appended claims.

What is claimed is:

1. A connector for connecting a first tubular member to a second tubular member, the second tubular member having a seating surface and comprising an engagable locking profile, the connector comprising:

a housing for securing the connector to the first tubular member, the housing comprising a seating surface for contacting the seating surface of the second tubular member;

a locking assembly having a locking portion engagable with a locking profile disposed on the inside surface of the second tubular member, the locking assembly movable between an unlocked position, in which the locking portion of the locking assembly is not in engagement with the locking profile of the second tubular member, to a locked position, in which the locking portion of the locking assembly is engaged with the locking profile of the second tubular member and in which the seating surface of the housing is in contact with the seating surface of the second tubular member;

a first actuator operable to move the locking assembly from the unlocked position to the locked position;

a second actuator operable after operation of the first actuator to apply an axial tensile load to the locking assembly, thereby urging the seating surface of the housing against the seating surface of the second tubular member, the second actuator operable only after the locking portion of the locking assembly is fully engaged with the locking profile of the second tubular member; and, the locking portion of the locking assembly is moved in a radial direction when acted upon by the first actuator.

2. A connector as claimed in claim 1, wherein the locking portion of the locking assembly comprises a groove dog and the locking profile of the second tubular member comprises a complementary running groove, the groove dog engaging with the running groove when the locking assembly is in the locked position.

3. A connector as claimed in claim 2, wherein the first actuator comprises a first actuator collar movable in the axial direction, the first actuator collar comprising an actuator portion, which acts upon the locking portion of the locking assembly when the first actuator collar is moved in an axial direction.

4. A connector as claimed in claim 3, wherein the actuator portion of the first actuator collar comprises a taper, movement of the first actuator collar in an axial direction bringing the taper into contact with the locking portion of the locking assembly, continued movement of the first actuator collar causing the taper to urge the locking portion of the locking assembly into engagement with the locking profile of the second tubular member.

5. A connector as claimed in claim 1, wherein the locking assembly comprises a loading portion, the loading portion being distanced from the locking portion in the axial direction and being operable upon by the second actuator.

6. A connector as claimed in claim 5, wherein the second actuator comprises a second actuator collar movable in an axial direction, movement of the second actuator collar in an axial direction causing an axial tensile load to be applied to the locking assembly.

7. A connector as claimed in claim 6, further comprising a loading member, movement of the second actuator collar causing the loading member to apply an axial tensile load to the locking assembly.

8. A connector as claimed in claim 7, wherein movement of the second actuator collar in axial direction causes movement of the loading portion of the locking assembly in a radial direction, radial movement of the loading portion causing the loading member to apply an axial tensile load to the locking assembly.

9. A connector as claimed in claim 8, wherein the loading member is a loading ring disposed radially outwards of the loading portion of the locking assembly.

10. A connector as claimed in claim 9, further comprising a gasket, wherein the loading member is moveable in an axial direction under the action of applying an axial tensile load to the locking assembly to thereby set the gasket to provide a seal between the housing and the second tubular member.

11. A connector as claimed in claim 8, wherein the loading portion of the locking assembly comprises a first taper and the loading member comprises a second taper, the first and second tapers cooperating, whereby radial movement of the loading portion of the locking assembly moves the first taper against the second, thereby applying an axial tensile load on the locking assembly.

12. A connector as claimed in claim 8, wherein the second actuator collar comprises a taper, whereby axial movement of the second actuator collar allows the taper to urge the loading portion of the locking assembly in a radial direction.

13. A connector as claimed in claim 5, wherein the locking assembly comprises a plurality of axially extending locking members, each locking member having a locking portion at a first end and a loading portion at a second end.

14. A connector as claimed in claim 1, wherein the first actuator and the second actuator comprise first and second actuator portions of a single actuator collar moveable in an axial direction, axial movement of the single actuator collar causing the first actuator to move the locking assembly from the unlocked position to the locked position, continued axial movement of the single actuator collar causing the second actuator to cause an axial tensile load to be applied to the locking assembly.

15. A connector as claimed in claim 1, wherein the locking assembly is biased into the unlocked position.

16. A connector as claimed in claim 1, wherein the locking assembly is moveable from the locked position to the unlocked position.

17. A connector as claimed in claim 16, wherein a first force may be applied to move the locking assembly from the unlocked position to the locked position and a second force may be applied to move the locking assembly from the locked position to the unlocked position, the second force being greater than the first force.

18. A connector as claimed in claim 1, wherein the first and second actuators are activated by hydraulic pressure.

19. A connector as claimed in claim 1, further comprising an override assembly, operation of the override assembly causing the locking assembly to be moved from the locked position to the unlocked position.

20. A connector as claimed in claim 19, wherein the override assembly comprises a lock for securing the locking assembly in the locked position.

21. A connector as claimed in claim 19, wherein the override assembly comprises an indicator to indicate the position of the locking assembly.

22. A connector as claimed in claim 1, further comprising a centralizing ring for centrally locating the position of the first tubular member with respect to the second tubular member.

23. A connector as claimed in claim 22, wherein the connector when installed in the second tubular member creates a couple between the centralizing ring and the region of contact of the seating surface of the housing and the seating surface of the second tubular member capable of resisting bending moments between the first and second tubular members.

24. A connector as claimed in claim 1, wherein fluid pressure within the second tubular member biases the locking assembly into the locked position.

* * * * *